Figure 1:
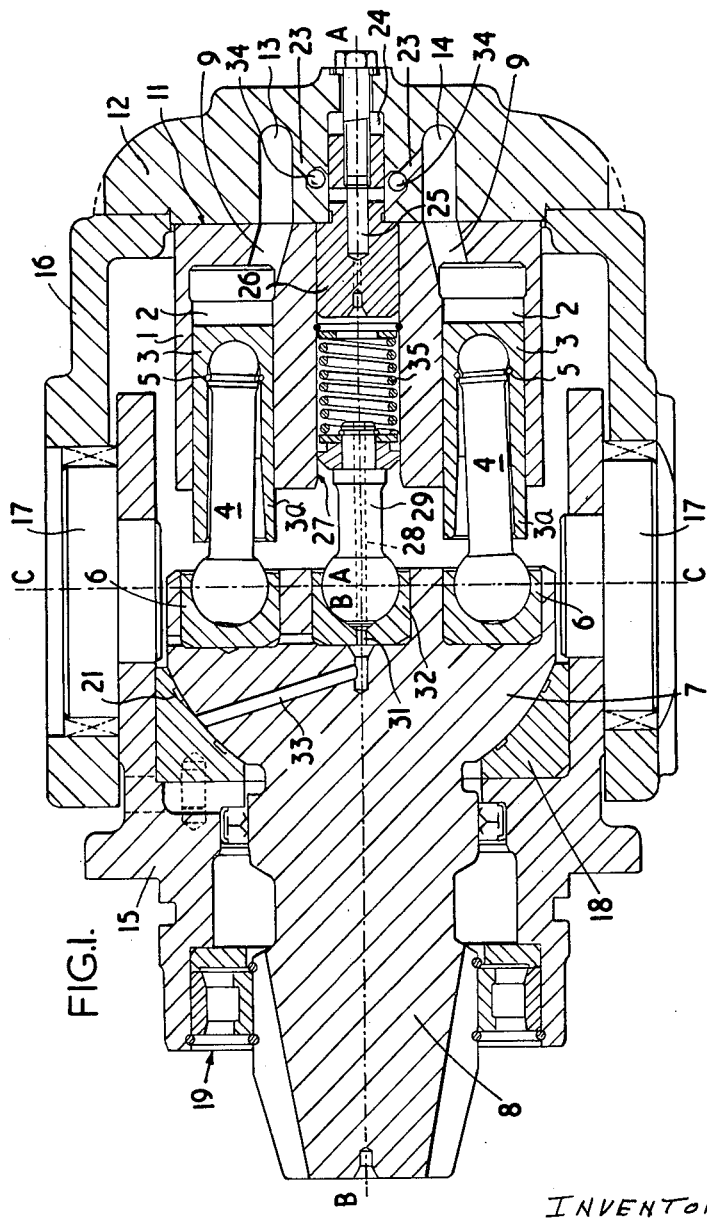

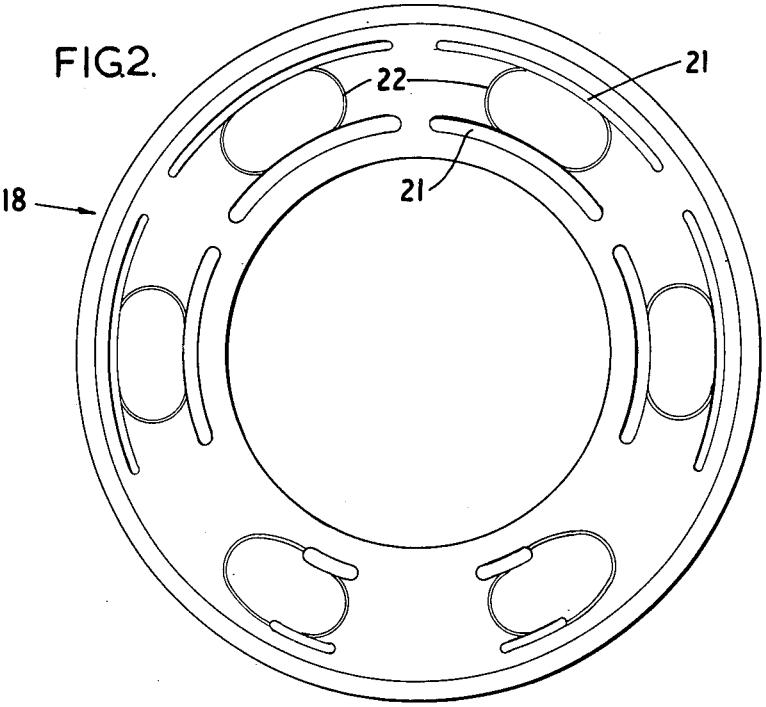

United States Patent Office 3,198,131
Patented Aug. 3, 1965

3,198,131
HYDROSTATIC BEARING FOR THE DRIVE FLANGE OF A HYDRAULIC PUMP OR MOTOR
Oswald Thoma, Charlton Kings, England, assignor to Dowty Hydraulic Units Limited, Ashchurch, England, a British company, and Unipat A.G., Glarus, Switzerland, a Swiss company
Filed Feb. 5, 1963, Ser. No. 256,391
Claims priority, application Great Britain, Apr. 6, 1962, 13,367/62
8 Claims. (Cl. 103—162)

This invention relates to hydraulic pumps or motors. It will be referred to hereinafter at times as a motor, but this is intended to include its use as a pump.

The present invention provides a hydraulic pump or motor including a rotatably mounted cylinder block having a series of cylinders extending substantially parallel to the rotational axis of the cylinder block, a series of pistons each reciprocably mounted in a different one of the series of cylinders in the cylinder block, a drive flange mounted for rotation with the cylinder block about an axis inclined to the rotational axis of the cylinder block, a series of connecting rods each connected to a different one of the series of pistons and to the drive flange, liquid inlet means and liquid outlet means associated with the cylinder block, a bearing member in which the drive flange is rotatably mounted, the drive flange and the bearing member co-operating to define chambers, and conduit means passing through the central region of the cylinder block and the drive flange and adapted to supply liquid under pressure from the cylinders to the chambers, the liquid under pressure providing a thrust which balances at least some of the thrust exerted on the drive flange by the connecting rods during operation of the pump or motor.

When the pump or motor is in operation, the feed of liquid under pressure from the conduit means to each chamber may be intermittent.

The chambers may be formed by the co-operation of recesses in the bearing member and the drive flange, the recesses being arranged in such a manner that the majority of the thrust exerted by liquid under pressure in the chambers occurs over not more than half of the bearing area of the bearing member.

A spring may be located in the conduit means in the cylinder block to urge the cylinder block in a direction away from the drive flange.

The connecting rods may form a driving connection between the drive flange and the cylinder block to cause the cylinder block to rotate with the drive flange.

One embodiment of the invention will now be described, with reference to the accompanying drawing, of which, FIGURE 1 is an axial sectional view of a hydraulic motor, and FIGURE 2 is an end view of the bearing member of the motor.

With reference to the accompanying drawing, a hydraulic motor includes a cylinder block 1 mounted for rotation about an axis A—A and having a series of cylinders 2 extending substantially parallel to and spaced equally around the axis A—A. A piston 3 is reciprocably mounted in each cylinder 2 and has a socket in which the ball-end of a connecting rod is retained by a circlip 5, each piston 3 having a skirt 3a which surrounds the connecting rod 4 over a portion of its length. The other end of each connecting rod 4 is also a ball-end and is received in a socket in one of a series of bearings 6 carried by a drive flange 7. The drive flange 7 is integral with a shaft 8.

The cylinders 2 communicate by means of ports 9 with an end face 11 of the cylinder block 1 which is in communication with a valve member 12. The valve member 12 co-operates with the ports 9 in known manner to control the flow of fluid into and out of the cylinders 2 as the drive flange 7 and cylinder block 1 rotate to produce reciprocation of the pistons 3, provided the axis A—A is titled with respect to the rotational axis B—B, about tilt axis C—C. The valve member 12 has ports 13 and 14 which form liquid inlet means and liquid outlet means through which liquid flows into and out of the cylinders 2 and ports 9.

The drive flange 7 and shaft 8 are mounted for rotation about an axis B—B which is inclined to the axis A—A in a plane perpendicular to the plane of the sectional view of FIGURE 1. Besides causing reciprocating movement of the pistons 3 as the cylinder block 1 and drive flange 7 rotate, the connecting rods 4 by engagement with the skirts 3a of pistons 3 also form a driving connection between the cylinder block 1 and drive flange 7 to cause the cylinder block 1 and drive flange 7 to rotate together. The drive flange 7 and shaft 8 are mounted in a housing 15 and this housing 15 carries a yoke 16 to which the valve member 12 is secured, and with which the cylinder block 1 can tilt as it rotates. The yoke 16 is pivotally connected to the housing 15 by trunnions 17 secured to the housing 15 and, by moving the yoke 16 relatively to the housing 15, the cylinder block 1 is moved relatively to the drive flange 7 about an axis C—C to vary the angle of inclination of axis B—B to axis A—A.

The drive flange 7 is mounted in a bearing member 18 secured to the housing 15 and a roller bearing 19 is interposed between the shaft 8 and the housing 15. The co-operating surfaces of the drive flange 7 and bearing member 18 are part-spherical and, as clearly shown in FIGURE 2, the part-spherical surface of the bearing member 18 has a number of arcuately-extending recesses 21. Some of the recesses 21 lie on a circle of one diameter and the remainder of the recesses 21 lie on a circle of larger diameter. Each recess 21 on the larger diameter circle is connected to a recess 21 on the smaller diameter circle by two grooves 22. The recesses 21 co-operate with the surface of the drive flange 7 to form chambers and the grooves 22 co-operate with the surface of the drive flange 7 to form restricted passages leading to the chambers.

Liquid under pressure is supplied from the ports 13 and 14 in the valve member 12 to the chambers by conduit means which passes through the central region of the cylinder block 1 and the drive flange 7. The conduit means includes passages 23 in the valve member 12 leading from the ports 13 and 14 to a central bore 24 in the valve member 12, a passage 25 in a member 26 extending into the bore 24 and a central cylindrical bore 27 in the cylinder block 1, a portion of the bore 27, a bore 28 in a connecting member 29 extending between the cylinder block 1 and the drive flange 7, a bore 31 in a bearing 32 for the connecting member 29 and a series of passages 33 leading from the bore 31 to the part-spherical surface of the drive flange 7.

Each passage 23 has a ball 34 which co-operates with the wall of the passage to form a non-return valve which acts to prevent liquid flowing from the passage 25 to either of the ports 13 or 14 and ensures that liquid flows into the passage 25 only from the passage 13 which is at the higher pressure.

The connecting member 29 is slidable in a liquid tight manner in bore 27 and extends to a ball located in the bearing socket 32. Spring 35 within bore 27 reacts between member 29 and the cylinder block 1 to urge the latter towards the valve plate. During operation of the motor the cylinder block 1, the drive flange 7, the connector 29 and spring 35 all rotate at the same speed and no separate thrust bearing is required in series with the spring 35 in order that it may exert its thrust on the cylinder block. Relative movement between the ball end of member 29 and socket 32 is not a continuous rotary motion but is rather a swashing movement which results in considerably less wear than would otherwise occur if relative rotation between the ball end and socket 32 were at motor speed. The diameter of the cylindrical bore 27 is such that the hydraulic end load which reacts on the bore 29 is sufficient to maintain the ball urged within the socket 32 such that there is a substantially leak proof connection between bores 28 and 31. The arrangement of the member 29 as shown enables the ball thereof to be displaced slightly in directions transverse to its rotation axis in order to accommodate inaccuracies in location of the drive flange 7 relative to the cylinder block 1.

When the motor is operating, the drive flange 7 rotates relatively to the bearing member 18 and the ends of the passages 33 intermittently communicate with the grooves 22 with the result that liquid under pressure is intermittently supplied through the restricted passages formed by the grooves 22 and the part-spherical surface of the drive flange 7 to each of the chambers formed by the recesses 21 and the part-spherical surface of the drive flange 7.

The recesses 21 are of such area that the liquid under pressure therein forms a hydrostatic bearing and exerts forces on the drive flange 7 which balance at least some, and preferably a substantial proportion or all of, the thrust both radial and axial exerted on the drive flange 7 by the connecting rods 4 during operation of the motor. The shaft 8 may be driven by or drive another member through a connection which produces an axial thrust on the drive shaft 8, and this thrust is preferably arranged to assist the thrust produced by the liquid under pressure in the chambers in opposing the thrust produced on the drive flange 7 by the connecting rods 4. The liquid in the recesses 21 slowly leaks away between the co-operating part-spherical surfaces of the bearing member 18 and the drive flange 7, thus forming a controlled leak from the chambers.

In the described embodiment and with reference to FIGURE 2, it will be seen that the recesses 21 in the upper half of the angular extent of the bearing member 18, with respect to the drawing, have a greater surface area than and produce a greater thrust than the recesses 21 in the lower half of the angular extent of the bearing member. This is because the majority of the radial thrust which occurs on the drive flange 7 in the described motor is directed towards the upper half of the bearing member 18, the angle of inclination between the axes of rotation of the cylinder block 1 and drive flange 7 being fixed or only variable through a small angle.

Also, in the described embodiment, a helical spring 35 within the bore 27 of the cylinder block 1 acts between the connecting member 29 and the cylinder block 1 to urge the cylinder block 1 against the valve member 12 in a direction away from the drive flange 7.

I claim as my invention:

1. A hydraulic pump or motor including a rotatably mounted cylinder block having a series of cylinders extending substantially parallel to the rotational axis of the cylinder block, a series of pistons each reciprocably mounted in a different one of the series of cylinders in the cylinder block, a drive flange mounted for rotation with the cylinder block about an axis inclined to the rotational axis of the cylinder block, a series of connecting rods each connected to a different one of a series of pistons and to the drive flange, liquid inlet means and liquid outlet means associated with the cylinder block, at the block's end distant from the drive flange, a bearing member in which the drive flange is rotatably mounted, the drive flange and the bearing member co-operating to define chambers, and conduit means passing from the liquid inlet and outlet means through the central region of the cylinder block and the drive flange, and arranged to supply liquid under pressure from the cylinders to the chambers, the liquid under pressure providing a thrust which balances at least some of the thrust exerted on the drive flange by the connecting rods during operation of the pump or motor.

2. A hydraulic pump or motor according to claim 1 including means operable, when the pump or motor is in operation, to interrupt intermittently the feed of liquid under pressure from the conduit means to each chamber.

3. A hydraulic pump or motor according to claim 1 wherein a spring is located in the conduit means that passes through the central region of the cylinder block, and urges the cylinder block in a direction away from the drive flange.

4. A hydraulic pump or motor including a rotatably mounted cylinder block having a series of cylinders extending substantially parallel to the rotational axis of the cylinder block, a series of pistons each reciprocably mounted in a different one of the series of cylinders in the cylinder block, a drive flange mounted for rotation with the cylinder block about an axis inclined to the rotational axis of the cylinder block, a series of connecting rods each connected to a different one of a series of pistons and to the drive flange, liquid inlet means and liquid outlet means associated with the cylinder block, a bearing member in which the drive flange is rotatably mounted, the drive flange and the bearing member cooperating to define chambers, and conduit means comprising a central bore through the cylinder block, valve means connecting high pressure liquid to the central bore, a connecting member sealingly and slidably mounted in said central bore, a ball end forming part of said connecting member extending from the bore, and a socket centrally formed in the drive flange and enclosing said ball end, the connecting member having a bore arranged to carry liquid at pressure from the central bore to the drive flange, and the drive flange including a passage from the socket to the chambers to provide a thrust which balances at least some of the thrust exerted on the drive flange by the connecting rods during operation of the pump or motor.

5. A hydraulic pump or motor as claimed in claim 4 wherein the passage from the socket to the chambers includes at least one restrictor, and cooperating ports in the surfaces of the drive flange and bearing member are arranged to cause an intermittent restricted feed of liquid to the chambers during rotation of the drive flange.

6. A hydraulic pump or motor as claimed in claim 4 wherein the liquid inlet and outlet are incorporated in a valve member having a flat valve surface against which the cylinder block bears and including a compression spring acting directly between the connecting member and the cylinder block to urge the cylinder block from the drive flange against the valve member.

7. A hydraulic pump or motor as claimed in claim 4 wherein the chambers are arranged so that their total effective area over one half of the angular extent of the bearing surface is greater than the total effective area of the chamber in the other half of the angular extent of the bearing surface.

8. A hydraulic pump or motor as claimed in claim 4 wherein the cross sectional area of the central bore is bigger than the cross section of the ball end of the connecting member and the bore in the connecting member and the passage in the drive flange terminate at adjacent positions whereby hydraulic action within the central bore on the connecting member ensures that the ball end sealingly seats within its socket to connect the bore in the connecting member and the passage in a leak proof manner.

References Cited by the Examiner

UNITED STATES PATENTS

| | | | |
|---|---|---|---|
| 2,290,764 | 7/42 | Neuland | 103—162 |
| 2,871,798 | 2/59 | Thoma | 103—162 |
| 2,987,006 | 6/61 | Bowers et al. | 103—162 |

FOREIGN PATENTS 81,674 10/34 Sweden.

LAURENCE V. EFNER, *Primary Examiner.*